(12) United States Patent
Kobashi (10) Patent No.: US 9,383,622 B2
(45) Date of Patent: Jul. 5, 2016

(54) COLOR REFLECTIVE DISPLAY AND METHOD OF MANUFACTURING THE SAME

(71) Applicant: Toppan Printing Co., Ltd., Taito-ku (JP)

(72) Inventor: Yasuhiro Kobashi, Taito-ku (JP)

(73) Assignee: TOPPAN PRINTING CO., LTD, Taito-ku (JP)

( * ) Notice: Subject to any disclaimer, the term of this patent is extended or adjusted under 35 U.S.C. 154(b) by 25 days.

(21) Appl. No.: 14/493,602

(22) Filed: Sep. 23, 2014

(65) Prior Publication Data

US 2015/0009553 A1 Jan. 8, 2015

Related U.S. Application Data

(63) Continuation of application No. PCT/JP2013/057888, filed on Mar. 19, 2013.

(30) Foreign Application Priority Data

Mar. 23, 2012 (JP) .................................. 2012-068066

(51) Int. Cl.
*G02B 26/00* (2006.01)
*G02F 1/167* (2006.01)
(Continued)

(52) U.S. Cl.
CPC ............ *G02F 1/167* (2013.01); *G02F 1/13439* (2013.01); *G02F 1/133514* (2013.01);
(Continued)

(58) Field of Classification Search
CPC ........................................................ G02F 1/167
USPC ......................................................... 359/296
See application file for complete search history.

(56) References Cited

U.S. PATENT DOCUMENTS

| 2014/0071557 A1 | 3/2014 | Cain |
| 2014/0211297 A1 | 7/2014 | Kobashi et al. |

(Continued)

FOREIGN PATENT DOCUMENTS

| EP | 2 762 970 A1 | 8/2014 |
| JP | 2551783 | 8/1996 |

(Continued)

OTHER PUBLICATIONS

International Search Report issued Jun. 25, 2013, in Application No. PCT/JP2013/057888.

(Continued)

*Primary Examiner* — James Jones
(74) *Attorney, Agent, or Firm* — Oblon, McClelland, Maier & Neustadt, L.L.P.

(57) ABSTRACT

A color reflective display includes a substrate, an electrode pattern layer formed on the substrate, a reflective display-material layer formed on the electrode pattern layer, a light-transmissive electrode layer formed on the reflective display-material layer, a transparent layer formed on the transmissive electrode layer, and a color filter layer formed on the transparent layer and including an array of colored pixels. The color reflective display satisfies a following first formula when $(0.54 \times C) - 15$ μm is zero or a positive value: $(0.54 \times C) - 15$ μm $\le D \le (0.54 \times C)$, and the color reflective display satisfies a following second formula when $(0.54 \times C) - 15$ μm is a negative value: $0 < D \le (0.54 \times C)$, where C represents a distance from the reflective display-material layer to the color filter layer, and D represents a distance between adjacent colored pixels of the color filter layer.

16 Claims, 4 Drawing Sheets

(51) Int. Cl.
*G02F 1/1335* (2006.01)
*G02F 1/1343* (2006.01)
*G02B 5/20* (2006.01)

(52) U.S. Cl.
CPC ....... *G02B5/20* (2013.01); *G02F 2001/133562* (2013.01); *G02F 2001/1676* (2013.01); *G02F 2203/02* (2013.01)

(56) References Cited

U.S. PATENT DOCUMENTS

2015/0009552 A1\* 1/2015 Kitazawa ................ G02F 1/167 359/296
2015/0168800 A1\* 6/2015 Kitazawa .......... G02F 1/133516 359/296

FOREIGN PATENT DOCUMENTS

| | | |
|---|---|---|
| JP | 2000-043405 | 2/2000 |
| JP | 2000-238408 | 9/2000 |
| JP | 3967841 | 6/2007 |
| JP | 2008-116895 | 5/2008 |
| JP | 4207448 | 10/2008 |
| JP | 2008-272972 | 11/2008 |
| JP | 4415525 | 12/2009 |
| JP | 4568429 | 8/2010 |
| JP | 4651992 | 12/2010 |
| JP | 2011-095339 | 5/2011 |
| WO | WO 2012/152907 A1 | 11/2012 |

OTHER PUBLICATIONS

Extended European Search Report issued Sep. 21, 2015 in Patent Application No. 13765174.1.

\* cited by examiner

COLOR REFLECTIVE DISPLAY AND METHOD OF MANUFACTURING THE SAME

CROSS-REFERENCE TO RELATED APPLICATIONS

The present application is a continuation of International Application No. PCT/JP2013/057888, filed Mar. 19, 2013, which is based upon and claims the benefits of priority to Japanese Application No. 2012-068066, filed Mar. 23, 2012. The entire contents of these applications are incorporated herein by reference.

BACKGROUND OF THE INVENTION

1. Technical Field

The present invention relates to color reflective displays and methods of manufacturing them; the color reflective displays have improved light-use efficiency.

2. Background

The expansion of electronic information networks makes electronic publishing common; the electronic publishing includes publication of e-books as a representative example. Self-luminous displays and/or backlight displays are usually used to display electronic publications and/or electronic information. Long-term use of these displays cause fatigue more than that of printed paper media for ergonomic reasons. These displays have large power consumption, so they have limited display time when powered by cells.

On the other hand, reflective displays as represented by electronic papers allow users to read characters with the same feeling as papers, resulting in reduction of the user's tiredness. Reflective displays provide display performance in sunlight or light outdoors, so they are suitable for use as outdoor signboards. Reflective displays have small power consumption so that they have a long lifetime, and consume no power except for updating screened images. For this reason, reflective displays can also be used as electronic signboards and electronic shelf label. Under the aforementioned circumstances, reflective displays are being developed.

SUMMARY OF INVENTION

According to one aspect of the present invention, a color reflective display includes a substrate, an electrode pattern layer formed on the substrate, a reflective display-material layer formed on the electrode pattern layer, a light-transmissive electrode layer formed on the reflective display-material layer, a transparent layer formed on the transmissive electrode layer and a color filter layer formed on the transparent layer and including an array of colored pixels. The color reflective display satisfies a following first formula when $(0.54 \times C) - 15$ µm is zero or a positive value: $(0.54 \times C) - 15$ µm $\leq D \leq (0.54 \times C)$, and the color reflective display satisfies a following second formula when $(0.54 \times C) - 15$ µm is a negative value: $0 < D \leq (0.54 \times C)$, where C represents a distance from the reflective display-material layer to the color filter layer, and D represents a distance between adjacent colored pixels of the color filter layer.

According to another aspect of the present invention, a color reflective display includes a substrate, an electrode pattern layer formed on the substrate, a reflective display-material layer formed on the electrode pattern layer, a light-transmissive electrode layer formed on the reflective display-material layer, a transparent layer formed on the light-transmissive electrode layer, and a color filter layer formed on the transparent layer and including an array of colored pixels. The color reflective display forms a panel that has a substantially rectangular shape with a longitudinal side, and the color reflective display satisfies a following formula: $(B \times C/A) - 15$ µm $\leq D \leq (B \times C/A)$ where A represents a distance between the panel of the color reflective display and a viewer, the distance A is 500 mm when the panel of the color reflective display has a size of 210×297 mm or smaller, the distance A is 1000 mm when the panel of the color reflective display has a size greater than 210×297 mm, B represents a length of the longitudinal side of the panel of the color reflective display, C represents a distance from the reflective display-material layer to the color filter layer, and D represents a distance between the colored pixels.

According to still another aspect of the present invention, a method of manufacturing a color reflective display includes forming an electrode pattern layer on a substrate, forming a reflective display-material layer on the electrode pattern layer, forming a light-transmissive electrode layer on the reflective display-material layer, forming a transparent layer on the light-transmissive electrode layer, and forming a color filter layer including an array of colored pixels on the transparent layer such that the color reflective display is obtained. The color reflective display is formed such that, when $(0.54 \times C) - 15$ µm is zero or a positive value, a following first formula is satisfied: $(0.54 \times C) - 15$ µm $\leq D \leq (0.54 \times C)$, and when $(0.54 \times C) - 15$ µm is a negative value, a following second formula is satisfied: $0 < D \leq (0.54 \times C)$ where C represents a distance from the reflective display-material layer to the color filter layer, and D represents a distance between the colored pixels.

According to yet another aspect of the present invention, a method of manufacturing a color reflective display includes forming an electrode pattern layer on a substrate, forming a reflective display-material layer on the electrode pattern layer, forming a light-transmissive electrode layer on the reflective display-material layer, forming a transparent layer on the light-transmissive electrode layer, and forming a color filter layer including an array of colored pixels on the transparent layer such that the color reflective display is obtained. The color reflective display is formed such that a following formula is satisfied: $(B \times C/A) - 15$ µm $\leq D \leq (B \times C/A)$ where A represents a distance between the panel of the color reflective display and a viewer, the distance A is 500 mm when the panel of the color reflective display has a size of 210×297 mm or smaller, the distance A is 1000 mm when the panel of the color reflective display has a size greater than 210×297 mm, B represents a length of the longitudinal side of the panel of the color reflective display, C represents a distance from the reflective display-material layer to the color filter layer, and D represents a distance between the colored pixels.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION OF THE EMBODIMENTS

The embodiments will now be described with reference to the accompanying drawings, wherein like reference numerals designate corresponding or identical elements throughout the various drawings.

First Embodiment

A first embodiment will be described with reference to the accompanying drawings.

Figure 1:
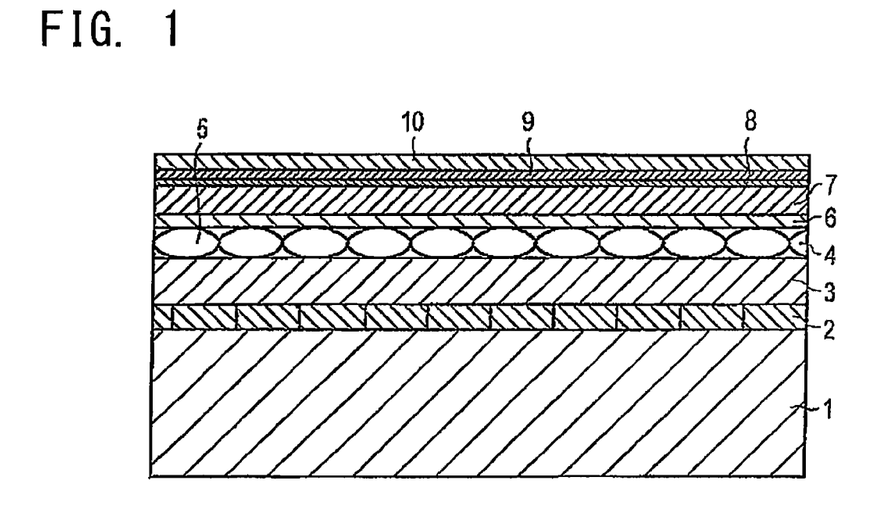
FIG. 1 is a cross sectional view illustrating an example of a color reflective display according to a first embodiment of the present invention.

FIG. 1 is a cross sectional view illustrating the structure of a color reflective display according to the first embodiment. An electrophoretic display, which is usually called a reflective display, is described in Japanese Patent Publication No. 2551783. The Patent Publication No. 2551783 describes an electrophoretic display. The electrophoretic display includes opposite electrode plates each having at least one light-transmissive surface. A disperse system including electrophoretic particles is filled between the opposite electrode plates. A display-control voltage applied between the opposite electrode plates causes change in the optical reflective characteristics to thereby generate desired displays.

Referring to FIG. 1, the color reflective display includes, in sequence on a substrate 1:

an electrode-pattern layer 2; an adhesive layer 3; a microcapsule layer 4 including microcapsules 5; a light-transmissive electrode layer 6, i.e. a transparent electrode layer 6; a transparent resin film 7; an ink fixing layer 8; a color filter layer 9 including an array of colored pixels; and a protective film 10. That is, the electrode-pattern layer 2, the adhesive layer 3, the microcapsule layer 4, the light-transmissive electrode layer 6, the transparent resin film 7, the ink fixing layer 8, and the color filter layer 9 are sequentially laminated on the substrate 1. A color electronic paper is used as an example of color reflective displays. In the first embodiment, the color filter layer 9 includes a matrix, i.e. a two-dimensional array, of colored pixels.

The substrate 1 is, for example, a transparent glass substrate. The electrode-pattern layer 2 and the adhesive layer 3 are formed in sequence on the substrate 1. The microcapsule layer 4 is laminated on the adhesive layer 3; the microcapsule layer 4 serves as a reflective display-material layer, i.e. an electrophoretic display layer. The microcapsules 5, which are bounded by resin, form the microcapsule layer 4. Each of the microcapsules 5 has a microcapsule shell, and encapsulates, in the microcapsule shell, transparent dispersion medium in which particles having different electrical polarities, such as white and black electrophoretic particles, are distributed. On the microcapsule layer 4, the light-transmissive electrode layer 6, the transparent resin film 7, the ink fixing layer 8, and the color filter layer 9 are sequentially mounted. The protective film 10 is mounted on the color filter layer 9.

In other words, the color reflective display according to the first embodiment is configured such that the color filter layer 9 is mounted above the electrode layer of a monochrome reflective display. Preferably, the ink fixing layer 8 is additionally mounted above the electrode layer, and the color filter layer 9 is formed on the ink fixing layer 8 using an ink-jet method.

An ink-jet storage medium described in Japanese Patent Publication No. 3967841 or a storage medium for ink-jet printing described in Japanese Patent Application Publication No. 2008-272972 is for example used as the ink fixing layer 8. The ink fixing layer 8 preferably has higher transparency. A porous receiver material for ink-jet as described in the Patent Publication No. 3967841 can be used as the ink fixing layer 8. Materials for the ink fixing layer 8 are desired to have: a transparent capability; a capability that prevents the received ink from being changed in color and browned; and various resistant capabilities. For example, vinyl resin, such as polyvinylbutyral, or polyvinyl acetate, can be used as a material for the ink fixing layer 8.

A material for the ink fixing layer 8 is coated on the transparent resin film 7 by a coater to have a dried thickness lying within the range from 3 to 10 μm. For example, a die coater, a spin coater, a bar coater, or the like can be used as the coater, but the coating method is not limited to these methods.

The coated material for the ink fixing layer 8 is solidified using heating, a vacuum, or a UV irradiation method which forms the ink fixing layer 8.

Ink for the color filter layer 9 is applied on the ink fixing layer 8 using an ink-jet method so as to match a grid electrode pattern of the electrode-pattern layer 2 on the substrate 1. This results in desired patterned colored pixels of the color filter layer 9. The inventor has found that the following method makes it possible to calculate optimum colored-pixel intervals.

Figure 2:
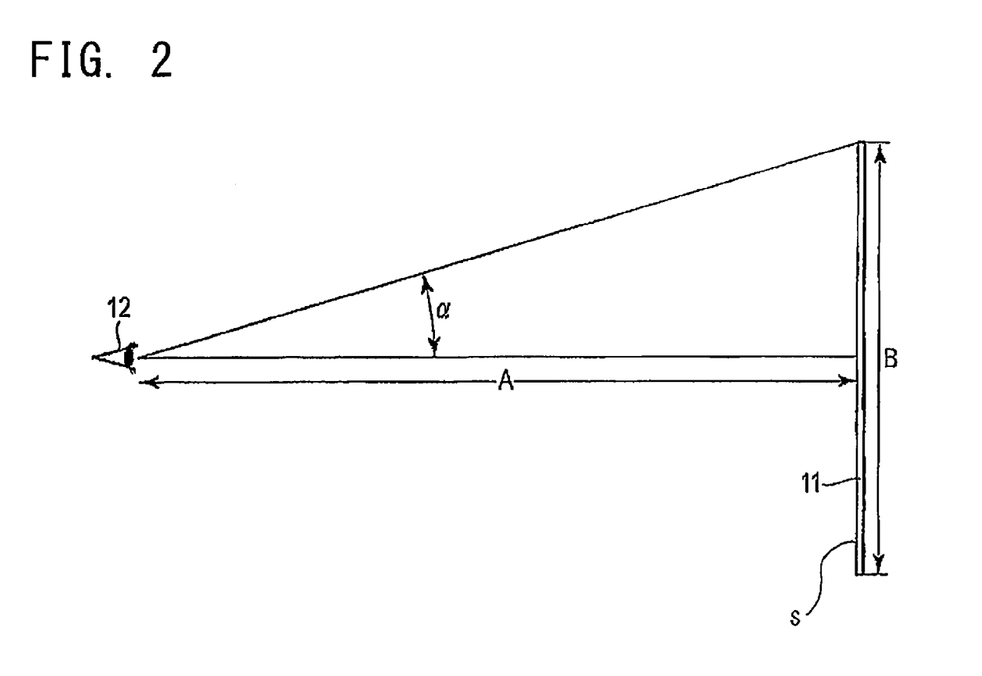
FIG. 2 is a view illustrating an example of a distance between a panel of the color reflective display according to the first embodiment and the eyes of a viewer when the panel is viewed by the viewer.

The color reflective display illustrated in FIG. 1 constitutes a panel, i.e. a flat screen device, 11. FIG. 2 illustrates an example of a distance A between the color-reflective-display panel 11, referred to as a panel 11, and the eyes 12 of a viewer, i.e. a human. The distance A, i.e. a minimum length, between the panel 11, i.e. an outer major surface (screen) S of the panel 11 corresponding to, for example, an outer major surface of the protective film 10, and the viewer, i.e. the viewer's eyes 12, is set to approximately 500 mm when the color reflective display is designed to be carriable and an electronic book is being read. The distance A between the panel 11 and the viewer's eyes 12 is changed depending on the intended use. The distance A between the panel 11 and the viewer's eyes 12 may be set to be 1 m or longer when the panel 11 is used as, for example, a signboard or an advertisement medium so that it is fixed.

The size of the panel 11 is selected depending on the intended use. When the panel 11 is designed to be carriable, the size of the panel 11 can be set to be within the range from pocket-book size, i.e. 120×180 mm to A-4 size, i.e. 210×297 mm inclusive. The panel 11 has a larger size when the panel 11 is used to be installed, or is used as a signboard or an advertisement medium. That is, the panel 11 can have one of a wide variety of sizes.

Let us assume that the panel 11 according to the first embodiment has a size of 210×297 mm or less.

In the first embodiment, the length between one end of a longitudinal side of the panel 11 and the other end thereof is referred to as B. The length between one end of another side, i.e. lateral side, of the panel 11 and the other end thereof can be referred to as B. The panel 11 with a shape except for a rectangular shape or a square shape can be applied to color reflective displays and methods of manufacturing them described hereinafter.

Reference character C shows the distance (thickness) from the microcapsule layer 4 to the color filter layer 9.

The reflective display includes the light-transmissive electrode layer 6 as its component. The transparent resin film 7 is mounted on the light-transmissive electrode layer 6. The light-transmissive electrode layer 6 is extremely less in thickness than the transparent resin film 7, so that the thickness of the transparent resin film 7 is substantially identical to the distance C. For this reason, the distance C from the microcapsule layer 4 to the color filter layer inclusive can be approximated to the thickness of the transparent resin film 7. In the first embodiment, the ink fixing layer 8 is mounted on the transparent resin film 7, so that the distance C can be set to the sum of the thickness of the transparent resin film 7 and the thickness of the ink fixing layer 8.

The transparent resin film 7 and the ink fixing layer 8 constitute a transparent layer. The ink fixing layer 8 may be or may not be formed on the transparent resin film 7. If the ink fixing layer 8 is not mounted on the transparent resin film 7, the color filter layer 9 is mounted, i.e. printed, on the transparent resin film 7 in place of the ink fixing layer 8, so that the thickness C of the transparent resin film 7 does not include the thickness of the ink fixing layer 8. The thickness C cannot include the thickness of the light-transmissive electrode layer 6 because the light-transmissive electrode layer 6 is sufficiently less in thickness than each of the transparent resin film 7 and the ink fixing layer 8, but the thickness of the light-transmissive electrode layer 6 can be included in the thickness C.

When the screen of the panel 11 is viewed by the viewer from the front of the screen, parallax takes place at a position of the panel 11; the position of the panel 11 has a large viewing angle from the viewer. For example, there is parallax at each lateral edge of the panel 11.

An angle $\alpha$ with respect to an edge of the panel 11 in the longitudinal-side direction, i.e. an angle $\alpha$ formed between the direction of the viewer's eyes 12 toward the center of the panel 11 and the direction of the viewer's eyes 12 toward an edge of the panel 11 in the longitudinal-side direction meets the following relational expression:

$$\tan \alpha = \{(B/2)/A\} \tag{1}$$

Figure 3:
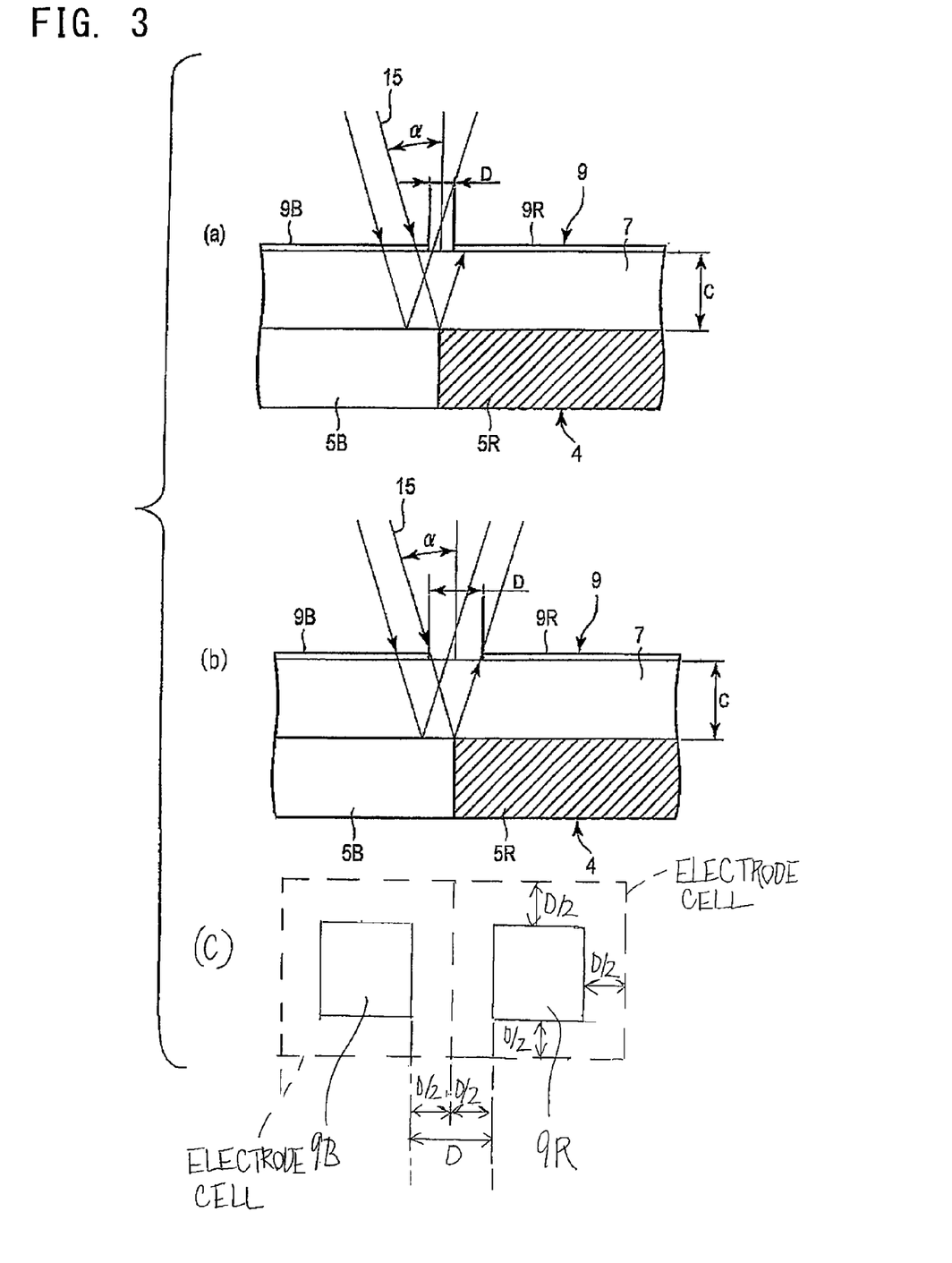
FIG. 3 is a cross sectional view illustrating a first example in which narrow colored-pixel intervals cause light to be attenuated, and a second example in which suitable colored-pixel intervals result in higher efficient light.

Light passing through the color filter layer 9 passes through the transparent resin film 7 formed on the light-transmissive electrode layer 6, and thereafter reaches the microcapsule layer 4 in which the white and black electrophoretic particles are filled (see FIG. 3). Driving electrodes of the light-transmissive electrode layer 6 cause the white and black electrophoretic particles in microcapsules 5 corresponding to the driven electrodes to move, so that black and white of the microcapsules 5 corresponding to colored pixels of the color filter layer 9 are changed. At that time, light incident to the panel 11, which has the incident angle $\alpha$, may cause light passing through a colored pixel not to necessarily reach a microcapsule 5 corresponding to the colored pixel.

FIG. 3 illustrates first and second examples of a main part of the panel 11, i.e. the structure of a part of the microcapsule layer 4, a corresponding part of the color filter layer 9, and a corresponding part of the transparent resin film 7 serving as a transparent electrode. In FIG. 3, the ink fixing layer 8 is omitted.

FIG. 3(a) is a view illustrating the first example in which narrow colored-pixel intervals D cause light to be attenuated. FIG. 3(b) is a view illustrating the second example in which suitable colored-pixel intervals D result in light efficiently passing through the color filter layer 9. In each of FIGS. 3(a) and 3(b), a microcapsule 5B of the microcapsule layer 4 corresponds to a blue-colored pixel 9B of the color filter layer 9, and a microcapsule 5R of the microcapsule layer 4 corresponds to a red-colored pixel 9R of the color filter layer 9.

For display of blue in each of FIGS. 3(a) and 3(b), the microcapsule 5R corresponding to the red-colored pixel 9R is driven in a black mode so that the black electrophoretic particles move to the side of the transparent resin film 7. For display of blue in each of FIGS. 3(a) and 3(b), the microcapsule 5B corresponding to the blue-colored pixel 9B is driven in a white mode so that the white electrophoretic particles move to the side of the transparent resin film 7.

FIG. 3(a), which illustrates narrow colored-pixel intervals D, shows that incident light 15 having the incident angle $\alpha$ passes through the blue-colored pixel 9B, and is reflected by the microcapsule 5B corresponding to the blue-colored pixel 9B. After the reflection, the light 15 passes through the red-colored pixel 9R, thus being returned. During the travel of the light 15, the light 15 having the incident angle $\alpha$ passes through the different colored pixels 9B and 9R, so that the light 15 is attenuated.

However, when the interval D between the colored pixels 9B and 9R satisfies the following relational formula (2), light passing through the blue-colored pixel 9B does not reach the microcapsule 5R corresponding to the red-colored pixel 9R:

$$D > C \times 2 \times \tan \alpha \tag{2}$$

Substituting the formula (1), which is expressed as $\tan \alpha = \{(B/2)/A\}$, into the formula (2) obtains the following formula (3):

$$D = B \times C/A \tag{3}$$

Thus, as illustrated in FIGS. 3(b) and 3(c), each of the colored pixels 9B and 9R is formed on a rectangular area, which is included in and smaller than a rectangular electrode cell of the grid electrode pattern, such that each side of each of the colored pixels 9B and 9R is located inwardly by D/2 with respect to a corresponding side of a corresponding electrode cell of the grid electrode pattern. Specifically, the length of each side of each of the colored pixels 9B and 9R is shorter by D than the length of a corresponding side of a corresponding electrode cell of the grid electrode pattern. This makes it possible to prevent the light 15 having the incident angle $\alpha$ and passing through a colored pixel from passing through another colored pixel. This results in the color-filer pattern of the color filter layer 9 having high light passing efficiency.

The inventor also has found that the pixel intervals D laying within the range from the value of "(B×C/A)−15 μm" to the value of "B×C/A" obtains a color filter with no large attenuation of light. This is probably because the center and its surrounding of the panel 11 has a small value of the angle $\alpha$.

Next, the distance A can be calculated using the level of a viewer's normal viewing field with respect to the panel 11. The viewing angle of the panel 11 usually can be estimated to 30 degrees or thereabout. When a viewer views the panel 11 from the front of the panel 11, the distance A is represented by the following formula (4):

$$A = B/(2 \tan(30°/2)) = B/0.54 \tag{4}$$

Thus, when the panel 11 has a size of 210×297 mm or less, substituting the formula (4) into the formula (3), which is expressed as D=B×C/A, obtains the following formula (5):

$$(0.54 \times C) - 15 \text{ μm} \leq D \leq (0.54 \times C) \tag{5}$$

Note that the formula (5) is used when the value of "(0.54×C)−15 μm" is zero or a positive value.

When the value of "(0.54×C)−15 μm" is a negative value, the following formula (6) is used:

$$0 < D \leq (0.54 \times C) \quad (6)$$

Next, an example of ink-jet coating applicators according to the first embodiment will be described hereinafter with reference to FIG. 4.

Figure 4:
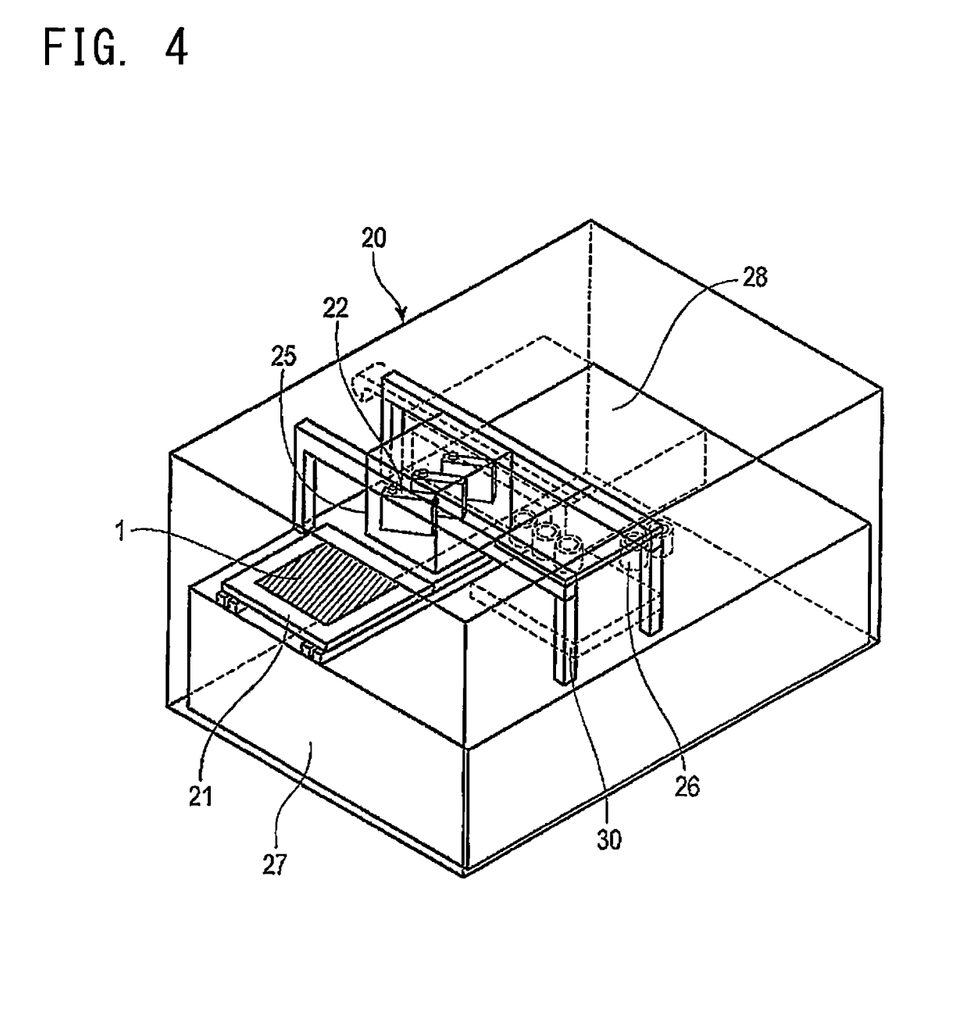
FIG. 4 is a perspective view illustrating an example of a color-filter printer according to the first embodiment.

FIG. 4 is a perspective view illustrating an example of the structure of an ink-jet coating applicator 20 used by a method of manufacturing the color reflective display according to the first embodiment. The ink-jet coating applicator 20 is equipped with a conveyor stage 21 and an ink-jet head unit 25.

The conveyor stage 21 conveys the substrate 1, on which the electrode-pattern layer 2, adhesive layer 3, microcapsule layer 4, light-transmissive electrode layer 6, transparent resin film 7, and ink fixing layer 8 are mounted in sequence, in one direction with high accuracy.

The ink-jet head unit 25 includes plural ink-jet heads 22 to which ink-jet ink for coating on the ink fixing layer 8 of the substrate 1 is supplied. The ink-jet head unit 25 is capable of maintaining the ink-jet head 22 at a predetermined height from the ink fixing layer 8 of the substrate 1 on the conveyor stage 21, and moving the ink-jet head 22 in a direction orthogonal to the conveying direction.

Each ink-jet head 22 is comprised of a plurality of nozzles for ejecting ink. The plurality of nozzles are aligned at predetermined regular intervals in a scanning direction in which a major surface, i.e. a top surface, of the ink fixing layer 8 is scanned by the ink-jet head 22 for coating the color filter layer 9 on the top surface of the ink fixing layer 8.

The ink-jet coating applicator 20 further includes an ink tank 26, an ink-jet control panel 27, and a drying unit 28.

The ink tank 26 supplies ink to each ink-jet head 22. The ink-jet control panel 27 controls how the nozzles of each ink-jet head 22 eject ink. The drying unit 28 dries ink coated on the ink fixing layer 8 of the substrate 1.

The distance from the nozzles of each ink-jet head 22 to the ink fixing layer 8 is set to be within the range between 300 and 2000 µm. This makes it possible to coat ink on the ink fixing layer 8 with higher accuracy. If the distance from the nozzles of each ink-jet head 22 to the ink fixing layer 8 was set to be equal to or less than 300 µm, there might be a high risk of some ink-jet heads 22 contacting the ink fixing layer 8. Otherwise, if the distance from the nozzles of each ink-jet head 22 to the ink fixing layer 8 was set to be equal to or more than 2000 µm, deflection, i.e. misdirection, of ejected ink during flight might likely take place.

The ink-jet coating applicator 20 includes a maintenance mechanism 30 for recovering the ejectability of the nozzles of each ink-jet head 22. The maintenance mechanism 30 is equipped with pots for wiping the nozzle surfaces of the respective ink-jet heads 22 with films or waste cloths or discharging liquid from the nozzles of each ink-jet head 22. A usually available maintenance mechanism for the ink-jet heads 22 can be used as the maintenance mechanism 30.

The ink-jet coating applicator 20 preferably includes an alignment camera and an image processing unit for determining the position of the pixel pattern for the color filter layer 9 on the major surface of the ink fixing layer 8; the pixel pattern matches with the grid electrode pattern of the electrode-pattern layer 2.

The ink-jet coating applicator 20 illustrated in FIG. 4 controls the ink-jet heads 22 each having the nozzles to scan the major surface of the ink fixing layer 8 while sequentially ejecting ink-jet ink into predetermined rectangular electrode cells programmed on the major surface of the ink fixing layer 8. The predetermined rectangular pixel areas match with the rectangular electrode cells of the grid electrode pattern. This application of the ink-jet ink forms an ink-jet ink layer, i.e. the color filter layer 9, on the ink fixing layer 8. In the first embodiment, it is possible to move the substrate 1, the ink-jet heads 20, or both the substrate 1 and the ink-jet heads 20.

Each pixel according to the first embodiment has a shape close to a rectangular shape. For this reason, a predetermined arrangement of ejected ink droplets is applied to create the rectangular-shaped pixels of the color filter layer 9. Specifically, it is preferable to create a high-definition arrangement pattern of ejected ink droplets based on correlations among the size of each pixel, the size of each ink droplet, and a landed area of each ink droplet.

Figure 5:
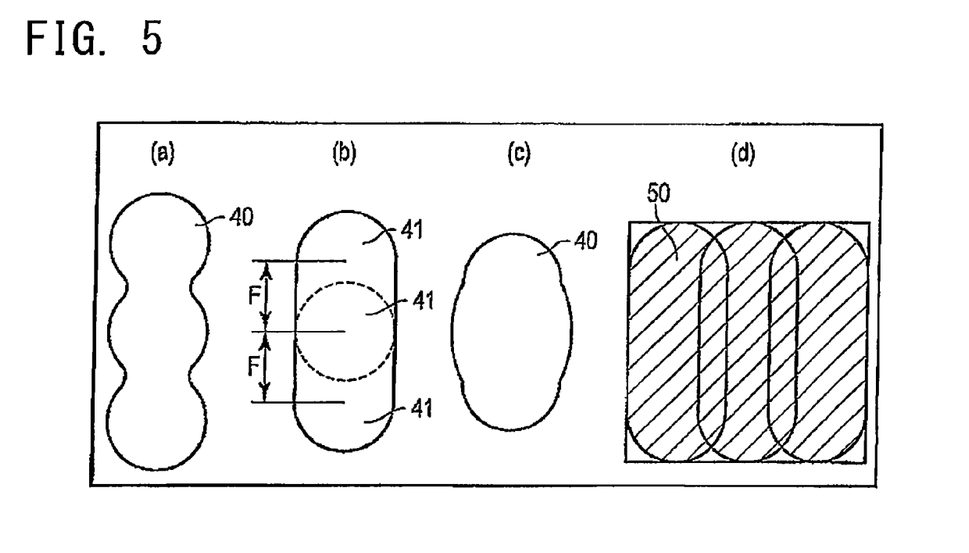
FIG. 5 is a view illustrating how to generate a pixel using an ink-jet method according to the first embodiment.

FIG. 5 is a view illustrating the shape of a pixel and the arrangement pattern of circular ejected ink droplets. FIG. 5(a) shows continuously applied ink droplets 40 landed on the major surface of the ink fixing layer 8. The continuously applied ink droplets 40 form a long-hole shaped pixel that has inward restrictions spaced in a longitudinal direction thereof when there are long intervals F between the respective circular ink droplets 41; the intervals F are illustrated in FIG. 5(b).

The pixel illustrated in FIG. 5(c) has an expanded middle portion in the longitudinal direction thereof when there are short intervals F between the respective circular ink droplets 41. Thus, it is preferable that adjustment of the diameter of each circular ink droplet and the intervals F results in a long-hole pixel having opposing sides linearly extending in the longitudinal direction of the pixel. Additionally, aligning a predetermined number of long-hole pixels each having opposing sides linearly extending in the longitudinal direction forms a rectangular-shaped colored pixel 50 (see FIG. 5(d)).

A component of a distance vector between adjacent nozzles of an ink-jet head 22 illustrated in FIG. 4, which is perpendicular to a main scan direction of the ink-jet head 22, is referred to as a first component. A component of a distance vector between adjacent same-colored pixels of the color reflective display, which is perpendicular to the main scan direction of the ink-jet head 22, is referred to as a second component. At that time, in a method of manufacturing the pixel pattern according to the first embodiment, ink-jet ink is ejected to be supplied to the pixel pattern from the ink-jet head 22 while the ink-jet head 22 is preferably oriented such that the first component is an n-th part of the second component; where n is an integer.

The ink-jet head 22 is preferably inclined with respect to the substrate carrying direction.

Figure 6:
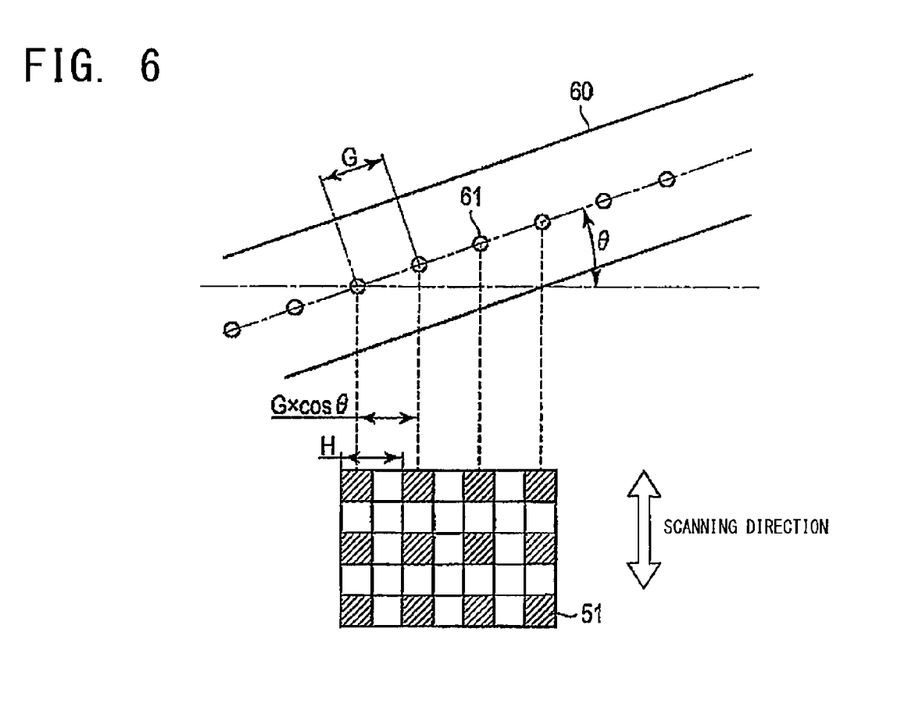
FIG. 6 is a view illustrating an example of a correlation between the inclination of an ink-jet head and intervals of electrode cells of an electrode pattern according to the first embodiment.

FIG. 6 illustrates nozzle pitches of an inclined ink-jet head 22. In FIG. 6, reference character 60 represents the nozzle surface of the ink-jet head 22, and reference character 61 represents the nozzles. The row of the nozzles 61 of the ink-jet head 22 is directed toward the ink fixing layer 8. The row of the nozzles 61 and the top surface of the ink fixing layer 8 are scanned relative to each other. The ink-jet head 22 is oriented such that the first component is the n-th part of the second component.

For example, the row of the nozzles 61 of the ink-jet head 22, i.e. the nozzle array direction, is inclined with respect to the substrate carrying direction by a given angle θ. Inclination of the nozzle array direction permits adjustment of the nozzle pitches. Let us assume that nozzle pitches with no inclination of the nozzle array direction are referred to as G. In this assumption, the nozzle pitches when the nozzle array direction is inclined by the angle θ with respect to the substrate carrying direction are expressed as G×cos θ. When the pitches H between the pixels 51 to which a same color should be printed are determined, the angle θ is calculated, based on the formula: cos θ=H/G, to align the nozzle pitches with the pitches H.

When the pitches H between the pixels 51 are longer than the nozzle pitches G, the angle θ can be calculated based on the formula: cos θ=H/2G that represents one nozzle being skipped. In the first embodiment, multiphase-division driving ink-jet heads are for example used. Each multiphase-division driving ink-jet head is designed such that: nozzles are divided into plural phases; and the nozzles of the respective phases are cyclically driven. In an ink ejecting and supplying process using a multiphase-division driving ink-jet head, the nozzles 61 categorized in at least one specified phase in the plural phases are assigned to eject ink according to the positions of the nozzles 61. The pitches between the nozzles 61 categorized in the same group are referred to as G. The ink-jet head 22 ejects, from specified nozzles 61, controlled ink droplets when corresponding rectangular pixel areas for pixels 51 pass below the specified nozzles 61. The ink droplets ejected from the specified nozzles 61 are coated on the corresponding pixel areas so that colored pixels 51 are formed.

As another example, there are ink-jet heads each designed to perform independent nozzle control for independently controlling nozzles. The independent nozzle control is designed to control ink ejecting timings of the respective nozzles according to the scanning speed and time in in the scanning direction. That is, ejecting operations of the nozzles are performed in accordance with the independent nozzle control.

As described above, the method of manufacturing the color reflective display according to the first embodiment uses the multiphase-division driving ink-jet heads 22. Specifically, nozzles of each ink-jet head 22 are divided into plural phases; and the nozzles of the respective phases are cyclically driven. In the ink ejecting and supplying process from the nozzles 61, the nozzles 61 categorized in at least one specified phase in the plural phases are limited as nozzles for ejecting ink.

In contrast, when the method uses the ink-jet heads each designed to perform the independent nozzle control, all the nozzles can be used to eject ink because each ink-jet head has a single phase. The first embodiment is not limited to the types of ink-jet heads, and therefore, given types of ink-jet heads can be used.

Materials for coloring ink according to the first embodiment include, for example, color pigments, resins, dispersing agents, and solvents.

Coloring ink can contain fluorine, and have liquid repellency. Three color pigments of red, green, and blue can be preferably used for coloring ink, but one or two of the three color pigments can be used. Color pigments of yellow, blue, and/or purple can be used for coloring ink. Various combinations of colors can be used for coloring ink.

Pigments used for colorants of ink can include:

Pigment Reds 919, 38, 43, 97, 122, 123, 144, 149, 166, 168, 177, 179, 180, 192, 215, 216, 208, 216, 217, 220, 223, 224, 226, 227, 228, and 240;

Pigment Blues 15, 15:6, 16, 22, 29, 60, and 64;

Pigment Greens 7, and 36;

Pigment Reds 20, 24, 86, 81, 83, 93, 108, 109, 110, 117, 125, 137, 138, 139, 147, 148, 153, 154, 166, 168, and 185;

Pigment Orange 36; and

Pigment Violet 23.

However, the pigments used for coloring ink are not limited to these pigments. Mixture of two or more pigments in these pigments can be used to obtain a desired hue.

Resins usable as materials for coloring ink includes casein, gelatin, polyvinyl alcohol, carboxymethyl acetal, polyimide resin, acrylic resin, epoxy resin, melanin resin, and other similar resins. One or more of these resins can be selected according to suitability with selected pigments. Acrylic resins can be preferably selected when heat and light fastness is desired for the materials for coloring ink.

Dispersing agents can be used for improving the dispersion of selected pigments. The dispersing agents include, as a non-ionic surface-active agent, polyoxyethylene alkyl ethers, and as ionic surface-active agents, alkyl benzene sulfonate, poly fatty acid salts, fatty acid salts alkyl phosphates, and tetraalkylammonium salts. The dispersing agents also include organic pigments derivatives, polyesters, and other similar agents. One dispersing agent can be merely used, or a mixture of or two or more dispersing agents can be used.

Solvents usable as materials for coloring ink preferably have a surface tension range 35 mN/m or lower, which is suitable for ink-jet printing, and a boiling point 130° C. or higher. A solvent having the surface tension range higher than 35 mN/m used as materials for coloring ink could have a negative impact on the stability of ejected dot shapes. A solvent having a boiling point lower than 130° C. could cause excessive dry around the nozzles, so that there could be a failure in a nozzle, such as nozzle clogging.

Specifically, solvents usable as materials for coloring ink include 2-methoxyethanol, 2-ethocyethanol, 2-butoxyethanol, 2-ethoxyethyl acetate, 2-butoxyethyl acetate, 2-methoxyethyl acetate, 2-ethoxyethyl ether, 2-(2-butoxyethoxy) ethanol, 2-(2-ethoxyethoxy)ethyl acetate, 2-(2-butoxyethoxy)ethyl acetate, 2-phenoxyethanol, diethylene glycol dimethyl ether, and the other similar solvents. Solvents usable as materials for coloring ink are however not limited to these described solvents, and other solvents that have the suitable properties as set forth above can be used as materials for coloring ink. When desired, a mixture of two or more solvents can be used as materials for coloring ink.

Referring to FIG. 1, the ink coated on the ink fixing layer 8 of the color reflective display is dried to be solidified by the drying unit 28. The drying unit 28 and/or a solidifying unit dries and/or solidifies the ink using, for example, heating, blowing, reduction in pressure, and light irradiation, or the combination of these processes.

After the ink dried to be solidified as the color filter layer 9, the protective film 10 is mounted on the color filter layer 9 to protect the color filter layer 9. On the colored pixel pattern, i.e. the color filter layer 9, an organic resin or an inorganic film can be formed as a protective layer serving as the protective film 10 using a coating method, such as spin coating, roll coating, or printing. As the organic resin, a polyamide film, a polyimide film, a polyurethane film, a polycarbonate film, an acrylic film, a silicone-based film, or the like can be used. The inorganic film can be made of $Si_3N_4$, $SiO_2$, SiO, $Al_2O_3$, $Ta_2O_3$, or the like.

The color reflective display, i.e. the panel 11, according to the first embodiment is configured to reduce inefficient reflection of incident light due to the effects of parallax to thereby reduce loss of light utilization.

Thus, the color reflective display has improved light-use efficiency.

The first embodiment describes the ink-jet approach for forming the color filter layer 9, but another color-filter forming approach, such as a photolithographic approach or an ink transfer approach can be used as an approach for efficiently forming colored pixels.

Second Embodiment

A second embodiment describes another method of calculating colored pixel intervals D.

Let us assume that the thickness from the microcapsule layer 4 to the color filter layer 9 is referred to as C (um), and the length of a longitudinal side of the panel 11 is referred to as B (mm). The distance between the panel 11 and the viewer is referred to as A (mm).

In these assumptions, the colored pixel intervals D are formed to satisfy the following:

$$(B \times C/A) - 15 \text{ μm} \leq D \leq (B \times C/A) \tag{6}$$

For example, when the panel 11 has a size of 210×297 mm or less and the distance A is set to 500 mm, the colored pixel intervals D are calculated by the following formula (7):

$$(B \times C/500) - 15 \leq D \leq (B \times C/500) \tag{7}$$

As another example, when the panel 11 has a size greater than 210×297 mm and the distance A is set to 1000 mm, the colored pixel intervals D are calculated by the following formula (8):

$$(B \times C/1000) - 15 \leq D \leq (B \times C/1000) \tag{8}$$

Note that the thickness C from the microcapsule layer 4 to the color filter layer 9 according to the second embodiment is preferably set to be within the range from 10 to 150 μm inclusive (10 μm≤C≤150 μm).

Each of the first and second embodiments can be variously modified as long as the subject matters of the present invention are unchanged.

EXAMPLES

Example 1

A color reflective display according to an example 1 will be described hereinafter. The color reflective display according to the example 1 is a color reflective display according to an example of the first embodiment.

A method of manufacturing the color reflective display having a printed color filter layer with a matrix of colored pixels according to the example 1 will be described hereinafter.

A microcapsule, electrophoretic color reflective display as the color reflective display according to the example 1 is manufactured.

The microcapsule, electrophoretic display causes positively charged white particles or negatively charged black particles encapsulated in a transparent solvent contained in each microcapsule to move toward the screen side or the other side using application of an external voltage. This forms colored images. Each microcapsule 5 has a spherical shape with a small diameter, i.e. small size, set within the range from several tens of microns to several hundreds of microns. These microcapsules 5 are distributed in a transparent binder, and coated as electronic ink on one major surface of the transparent resin film 7, on the other major surface of which the transparent electrode layer 6 has been mounted. That is, applying an external voltage to the electronic ink permits the electronic ink to draw an image.

The transparent resin film 7 on which the electronic ink has been coated is bounded on the substrate 1 on which a grid electrode pattern for active-matrix drive has been formed as the electrode-pattern layer 2, so that an active-matrix display panel is created. The transparent resin film 7 on which the electronic ink has been coated will be normally referred to as a front substrate, and the substrate 1 on which the grid electrode pattern for active-matrix drive has been formed will be normally referred to as a back substrate. A PET film having a thickness of 25 μm is used as the transparent resin film 7.

The panel 11 according to the example 1 has an A-4 size of 210×297 mm. The length of each side of each electrode cell of the grid electrode pattern is set to 200 μm. The panel in which no color filter is formed has reflectivity of 46% when displaying white color.

The method according to the example 1 forms the ink fixing layer 8 on the transparent resin film 7 of the front substrate. The mixture of an urethane resin, toluene, water, and IPA (isopropyl alcohol) is used as the material for the ink fixing layer 8. The ink fixing layer 8 is coated by a die coater on the transparent resin film 7 to have a dried thickness lying in the range from 7 to 9 μm inclusive. In the example 1, the ink fixing layer 8 is set to 8 μm.

A grid colored-pixel pattern is printed by the ink-jet coating applicator 20 on the ink fixing layer 8. Ink used by the printing contains a pigment, a synthetic resin, cyclohexanone, and diethylene glycol dimethyl ether. The percentages of the pigment, synthetic resin, cyclohexanone, and diethylene glycol dimethyl ether are respectively set to 3%, 22%, 5%, and 70%.

The thickness C from the microcapsule layer 4 to the color filter layer 9 is the sum of the thickness (25 μm) of the transparent resin film 7 and the thickness (8 μm) of the ink fixing layer 8. Thus, in accordance with the formula D=0.54×C=0.54×(25 μm+8 μm), the colored pixel intervals D are calculated to be approximately 18 μm.

Thus, the method according to the example 1 ejects, using the ink-jet coating applicator 20 in accordance with an ink-jet method, ink droplets each having a volume of 10 pL (picoliter) onto nine portions of the ink fixing layer 8; these nine portions constitute a square grid, and match with a corresponding electrode cell of the grid electrode pattern. This causes the ink droplets to print a colored square pixel having a size of 190×190 μm on the ink fixing layer 8. This printing is sequentially performed to print each of different colored pixels of red, green, and blue on the ink fixing layer 8 corresponding to an electrode cell of the grid electrode pattern, so that the color filer layer 9 is formed on the ink fixing layer 8.

Thereafter, the color filter layer 8 is thermally dried at a temperature of 80° C. for five minutes. After the drying, the protective layer 10 is laminated on the color filter layer 9, so that the color reflective display according to the example 1 is manufactured. The color reflective display manufactured according to the example 1 is a highly efficient color reflective display. This is because the color reflective display according to the example 1 has reflectivity of 25% when displaying white color and an NTSC (National Television Standards Committee) ratio of 7% that are higher than those of conventional color reflective displays.

Example 2

A color reflective display according to an example 2 will be described hereinafter. The color reflective display according to the example 2 is configured to satisfy the formula (7) according to the second embodiment.

The size of the panel 11 of the color reflective display according to the example 2 is set to be equal to or lower than the A-4 size of 210×297 mm, and the distance A between the panel 11 and the viewer is set to 500 mm. The other conditions are the same as those of the example 1.

In accordance with the formula D=(B×C/500)=(297 mm×(25 μm+8 μm)/500 mm, the colored pixel intervals D are calculated to be approximately 20 μm.

The color reflective display according to the example 2 has improved light-use efficiency as described in the second example.

Example 3

A color reflective display according to an example 3 will be described hereinafter. The color reflective display according to the example 3 is configured to satisfy the formula (8) according to the second embodiment.

The panel 11 according to the example 3 has a 28-inch size of 350×630 mm. The distance A between the panel 11 and the viewer is set to 1000 mm. A PET film having a thickness of 30 μm is used as the transparent resin film 7. The panel in which no color filter is formed has reflectivity of 45% when displaying white color.

The method according to the example 3 forms the ink fixing layer 8 on the transparent resin film 7 of the front substrate. The mixture of a urethane resin, toluene, water, and IPA is used as the material for the ink fixing layer 8. The ink fixing layer 8 is coated by a bar coater on the transparent resin film 7 to have a dried thickness lying in the range from 7 to 9 μm inclusive. In the example 3, the ink fixing layer 8 is set to 8 μm.

A grid colored-pixel pattern is printed by the ink-jet coating applicator 20 on the ink fixing layer 8. Ink used by the printing contains a pigment, a synthetic resin, cyclohexanone, and diethylene glycol dimethyl ether. The percentages of the pigment, synthetic resin, cyclohexanone, and diethylene glycol dimethyl ether are respectively set to 2%, 23%, 5%, and 70%.

The thickness C from the microcapsule layer 4 to the color filter layer 9 is the sum of the thickness (35 μm) of the transparent resin film 7 and the thickness (8 μm) of the ink fixing layer 8. Thus, in accordance with the formula D=(B×C/1000)=(630 mm×(30 μm+8 μm)/1000 mm), the colored pixel intervals D are calculated to be approximately 24 μm.

Thus, the method according to the example 3 ejects, using the ink-jet coating applicator 20 in accordance with an ink-jet method, ink droplets each having a volume of 14 pL onto nine portions of the ink fixing layer 8; these nine portions constitute a square grid, and match with a corresponding electrode cell of the grid electrode pattern. This causes the ink droplets to print a colored square pixel having a size of 218 μm×218 μm on the ink fixing layer 8. This printing is sequentially performed to print each of different colored pixels of red and green on the ink fixing layer 8 corresponding to an electrode cell of the grid electrode pattern, so that the color filer layer 9 is formed on the ink fixing layer 8.

Thus, the color reflective display manufactured according to the example 3 is a high-efficient color reflective display. This is because the color reflective display manufactured according to the example 3 has reflectivity of 30% when displaying white color, and is capable of displaying red color and green color.

Back-and-white reflective displays are sufficient to display character information of electronic publications. Color reflective displays are desired to display: artwork in books; advertisements; signboards; short clips; images; catalogs; and so on. Color reflective displays are desired with colorization of displayed contents, and there may be following technologies for color reflective displays.

For colorization of a reflective display, there may be a method using plural kinds of microcapsules each encapsulating therein distributed electrophoretic particles; these microcapsules display red, green, and blue. For example, Japanese Patent Publications No. 4568429 and No. 4207448, which will be referred to as first and second patent documents, describe respective examples of the method.

There may be a method using a color filter for colorization of a reflective display. There are various types of reflective display-material layers, such as an electrophoretic display layer. The electrophoretic display layer is composed of microcapsules bound by resin; each of the microcapsules encapsulates therein dispersion medium in which electrophoretic particles are distributed.

The following (a) to (e) represent respective examples of a display device equipped with a reflective display-material layer (see Japanese Patent Publication No. 4651992 as an example, which will be referred to as a third patent document):

(a) Rotating dichroic-member display;
(b) Electrochromic display;
(c) Electrowetting display;
(d) Electrophoretic display; and
(e) Electronic liquid powder display In a reflective display using a color filter, the color filter preferably has a pixel spacing that is set within a range from 1 to 20 μm inclusive (see Japanese Patent Publication No. 4415525, which will be referred to as a fourth patent document).

The method described in each of the first and second documents uses plural kinds of microcapsules each encapsulating therein distributed electrophoretic particles; the plural kinds of microcapsules display red, green, and blue. For the method, it may be difficult to align the microcapsules with respective electrode regions for red, green, and blue with high accuracy.

It is described in the fourth patent document that the method disclosed therein uses a color filter whose color filter patterns have intervals therebetween. Setting the intervals of the color-filter patterns to be lower than a predetermined length provides high contrast without light leakage; the intervals being longer than the predetermined length might change the state of the display medium due to electrical-field leakage from an adjacent electrode. It is also described in the fourth patent document that the predetermined length, which might change the state of the display medium due to electrical-field leakage from an adjacent electrode, is set to 20 μm. It is described in the fourth patent document that the colored-pixel intervals are preferably set to be within the range from 1 to 20 μm inclusive. The colored-pixel intervals are measured when the pixels of the color reflective display are viewed from the front of the color reflective display, and the values of the intervals are effective only if the effects of parallax are disregarded.

Viewing the panel, i.e. the display portion, of a color reflective display while changing the viewing angle may result in an unintended color of an adjacent pixel being viewed due to the effects of parallax. This is because a transparent electrode layer between the color filter layer and the microcapsule layer results in a distance therebetween.

In order to solve this problem, increasing colored-pixel intervals may be possible. However, excessive colored-pixel intervals might reduce the ratio of the area of the colored pixels to the area of electrode regions of an electrode pattern surrounding the colored pixels; the electrode regions serve as the color white. This might result in a non-colored section in a corresponding predetermined colored region of a display even if the display is controlled to display the predetermined color in the region. In addition, this might result in a displayed color of the display lighter than a desired color. Highly-colored pixels might reduce their light transmissibility, resulting in transmission of light through the highly-colored pixels being inefficient. For these reasons, it is desired to provide efficient arrangement of the colored pixels.

In order to address these circumstances, one aspect of the present invention provides color reflective displays, which are designed, based on the effects of parallax, to have improved light-use efficiency, and provide manufacturing methods of these color reflective displays.

In each of first to fourth aspects, a color reflective display includes in sequence on a substrate: an electrode pattern layer; a reflective display-material layer; a light-transmissive electrode layer; a transparent layer; and a color filter layer including an array of colored pixels.

In the first aspect, the color reflective display satisfies the following first formula:

$$(0.54 \times C) - 15 \, \mu m \leq D \leq (0.54 \times C)$$

where: C represents a distance from the reflective display-material layer to the color filter layer, and D represents a distance between adjacent colored pixels of the color filter layer, when a value of $(0.54 \times C) - 15 \, \mu m$ is zero or a positive value.

In the first aspect, the color reflective display satisfies the following second formula:

$$0 < D \leq (0.54 \times C)$$

when the value of $(0.54 \times C) - 15 \, \mu m$ is a negative value.

In the first aspect, the color reflective display constitutes a panel, and the panel has a size of 210×297 mm or less.

In the second aspect, the color reflective display has a substantially rectangular shape with a longitudinal side, and the color reflective display satisfies the following:

$$(B \times C/A) - 15 \, \mu m \leq D \leq (B \times C/A)$$

where A represents a distance between the panel of the color reflective display and a viewer, B represents a length of the longitudinal side of the panel of the color reflective display, C represents a distance from the reflective display-material layer to the color filter layer, and D represents distances between the colored pixels.

In the second aspect, the distance A between the panel of the color reflective display and the viewer is set to 500 mm when the panel of the color reflective display has a size of 210×297 mm or less. In the second aspect, the distance A between the panel of the color reflective display and the viewer is set to 1000 mm when the panel of the color reflective display has a size greater than 210×297 mm.

In the third aspect, the method satisfies the following first formula:

$$(0.54 \times C) - 15 \, \mu m \leq D \leq (0.54 \times C)$$

where C represents a distance from the reflective display-material layer to the color filter layer, D represents distances between the colored pixels, when a value of $(0.54 \times C) - 15 \, \mu m$ is zero or a positive value.

In the third aspect, the method satisfies the following second formula:

$$0 < D \leq (0.54 \times C)$$

when the value of $(0.54 \times C) - 15 \, \mu m$ is a negative value.

In the third aspect, the color reflective display constitutes a panel, and the panel has a size of 210×297 mm or less.

In the fourth aspect, the method satisfies the following formula $$(B \times C/A) - 15 \, \mu m \leq D \leq (B \times C/A)$$

where A represents a distance between the panel of the color reflective display and a viewer, B represents a length of the longitudinal side of the panel of the color reflective display, C represents a distance from the reflective display-material layer to the color filter layer, and D represents distances between the colored pixels.

In the fourth aspect, the distance A between the panel of the color reflective display and the viewer is set to 500 mm when the panel of the color reflective display has a size of 210×297 mm or less. In the fourth aspect, the distance A between the panel of the color reflective display and the viewer is set to 1000 mm when the panel of the color reflective display has a size greater than 210×297 mm.

In each of the first to fourth aspects, the distance C from the reflective display-material layer to the color filter layer is set to be within a range from 10 to 150 μm inclusive.

In each of the first to fourth aspects, the transparent layer includes a transparent resin film and an ink fixing layer. The transparent resin film is formed on the light-transmissive electrode layer. The ink-fixing layer is formed using an ink-jet method on the transparent film. The color filter layer is formed on the ink fixing layer.

A color reflective display according to each of the first to fourth aspects of the present invention reduces loss of light utilization of a corresponding a color reflective display due to inefficient reflection of incident light resulted from the effects of parallax. This results in the color reflective display according to each of the first to fourth aspects having improved light-use efficiency.

Obviously, numerous modifications and variations of the present invention are possible in light of the above teachings. It is therefore to be understood that within the scope of the appended claims, the invention may be practiced otherwise than as specifically described herein.

The invention claimed is:
1. A color reflective display, comprising:
a substrate;
an electrode pattern layer formed on the substrate;
a reflective display-material layer formed on the electrode pattern layer;
a light-transmissive electrode layer formed on the reflective display-material layer;
a transparent layer formed on the transmissive electrode layer; and
a color filter layer formed on the transparent layer and including an array of colored pixels,
wherein the color reflective display satisfies a following first formula when $(0.54 \times C) - 15 \, \mu m$ is zero or a positive value:

$$(0.54 \times C) - 15 \, \mu m \leq D \leq (0.54 \times C), \text{ and}$$

the color reflective display satisfies a following second formula when $(0.54 \times C) - 15 \, \mu m$ is a negative value:

$$0 < D \leq (0.54 \times C),$$

where C represents a distance from the reflective display-material layer to the color filter layer, and D represents a distance between adjacent colored pixels of the color filter layer.

2. The color reflective display according to claim 1, wherein the color reflective display forms a panel, and the panel has a size of 210×297 mm or less.

3. The color reflective display according to claim 1, wherein the distance C is 10 μm or more and 150 μm or less.

4. A color reflective display, comprising:
a substrate;
an electrode pattern layer formed on the substrate;
a reflective display-material layer formed on the electrode pattern layer;
a light-transmissive electrode layer formed on the reflective display-material layer;
a transparent layer formed on the light-transmissive electrode layer; and
a color filter layer formed on the transparent layer and including an array of colored pixels, wherein the color reflective display forms a panel that has a substantially rectangular shape with a longitudinal side, and the color reflective display satisfies a following formula:

$$(B \times C/A) - 15\ \mu m \leq D \leq (B \times C/A)$$

where A represents a distance between the panel of the color reflective display and a viewer, the distance A is 500 mm when the panel of the color reflective display has a size of 210×297 mm or smaller, the distance A is 1000 mm when the panel of the color reflective display has a size greater than 210×297 mm, B represents a length of the longitudinal side of the panel of the color reflective display, C represents a distance from the reflective display-material layer to the color filter layer, and D represents a distance between the colored pixels.

5. The color reflective display according to claim 4, wherein the panel of the color reflective display has a size of 210×297 mm or smaller, and the distance A is 500 mm.

6. The color reflective display according to claim 4, wherein the panel of the color reflective display has a size greater than 210×297 mm, and the distance A is 1000 mm.

7. The color reflective display according to claim 4, wherein the distance C is 10 μm or more and 150 μm or less.

8. A method of manufacturing a color reflective display, the method comprising:
   forming an electrode pattern layer on a substrate;
   forming a reflective display-material layer on the electrode pattern layer;
   forming a light-transmissive electrode layer on the reflective display-material layer;
   forming a transparent layer on the light-transmissive electrode layer; and
   forming a color filter layer including an array of colored pixels on the transparent layer such that the color reflective display is obtained,
   wherein the color reflective display is formed such that, when $(0.54 \times C) - 15$ μm is zero or a positive value, a following first formula is satisfied:

$$(0.54 \times C) - 15\ \mu m \leq D \leq (0.54 \times C), \text{ and}$$

when $(0.54 \times C) - 15$ μm is a negative value, a following second formula is satisfied:

$$0 < D \leq (0.54 \times C)$$

where C represents a distance from the reflective display-material layer to the color filter layer, and D represents a distance between the colored pixels.

9. The method according to claim 8, wherein the color reflective display forms a panel, and the panel has a size of 210×297 mm or less.

10. The method according to claim 8, wherein the distance C is 10 μm or more and 150 μm or less.

11. The method according to claim 8, wherein the forming of the transparent layer comprises forming a transparent resin film on the light-transmissive electrode layer and forming an ink-fixing layer on the transparent film using an ink-jet method, and the color filter layer is formed on the ink fixing layer.

12. A method of manufacturing a color reflective display, the method comprising:
   forming an electrode pattern layer on a substrate;
   forming a reflective display-material layer on the electrode pattern layer;
   forming a light-transmissive electrode layer on the reflective display-material layer;
   forming a transparent layer on the light-transmissive electrode layer; and
   forming a color filter layer including an array of colored pixels on the transparent layer such that the color reflective display is obtained,
   wherein the color reflective display is formed such that a following formula is satisfied:

$$(B \times C/A) - 15\ \mu m \leq D \leq (B \times C/A)$$

where A represents a distance between the panel of the color reflective display and a viewer, the distance A is 500 mm when the panel of the color reflective display has a size of 210×297 mm or smaller, the distance A is 1000 mm when the panel of the color reflective display has a size greater than 210×297 mm, B represents a length of the longitudinal side of the panel of the color reflective display, C represents a distance from the reflective display-material layer to the color filter layer, and D represents a distance between the colored pixels.

13. The color reflective display according to claim 12, wherein the panel of the color reflective display has a size of 210×297 mm or smaller, and the distance A is 500 mm.

14. The color reflective display according to claim 12, wherein the panel of the color reflective display has a size greater than 210×297 mm, and the distance A is 1000 mm.

15. The method according to claim 12, wherein the distance C is 10 μm or more and 150 μm or less.

16. The method according to claim 12, wherein the forming of the transparent layer includes forming a transparent resin film on the light-transmissive electrode layer and forming an ink-fixing layer on the transparent film using an ink-jet method, and the color filter layer is formed on the ink fixing layer.

* * * * *